Nov. 29, 1966  W. L. HOXTER  3,287,844
FISHING ROD SUPPORT
Filed Jan. 15, 1965

INVENTOR
WILLIAM L. HOXTER

BY Browne, Schuyler & Beveridge
ATTORNEYS

United States Patent Office 3,287,844
Patented Nov. 29, 1966

3,287,844
FISHING ROD SUPPORT
William L. Hoxter, Chester, Md.
Filed Jan. 15, 1965, Ser. No. 425,858
8 Claims. (Cl. 43—21.2)

This invention relates to fishing equipment, and more particularly to an attachment for a fishing rod for supporting the butt end of the rod against the body of the fisherman.

While trawling or reeling in a line, it is common for a fisherman to place the butt end of his fishing rod against his body in order to obtain additional leverage in manipulating the rod. This permits the fisherman to hold the rod with one hand, leaving the other free to operate the reel. While this is a convenient and natural manner in which to hold a fishing rod, the end of the rod pressing against the fisherman's body may result in considerable discomfort after extended periods. Also, the fisherman must retain a tight grip on the rod with one hand to prevent the rod from turning as the reel is operated.

In the past, numerous devices have been developed to eliminate the discomfort to the fisherman resulting from the end of the fishing rod being placed against his body. These devices have normally been in the form of a harness worn by the fisherman to provide a bearing surface for the end of the fishing rod, and some have been provided with means for preventing or restricting rotational movement of the rod when the rod is in position on the device. However, these devices have not been entirely satisfactory and, accordingly, it is an object of the present invention to provide an improved support for supporting a fishing rod against the body of a fisherman.

Another object of the invention is to provide such a support which is carried on the end of the fishing rod.

Another object of the invention is to provide an improved support carried on the end of a fishing rod for supporting the rod against the body of the fisherman and which will be effective to prevent turning of the rod.

Another object is to provide such a support for a fishing rod which may be folded along the side of the rod when not in use.

The above and other objects of the invention will become apparent from the following specification taken with the drawings, in which.

Figure 1:
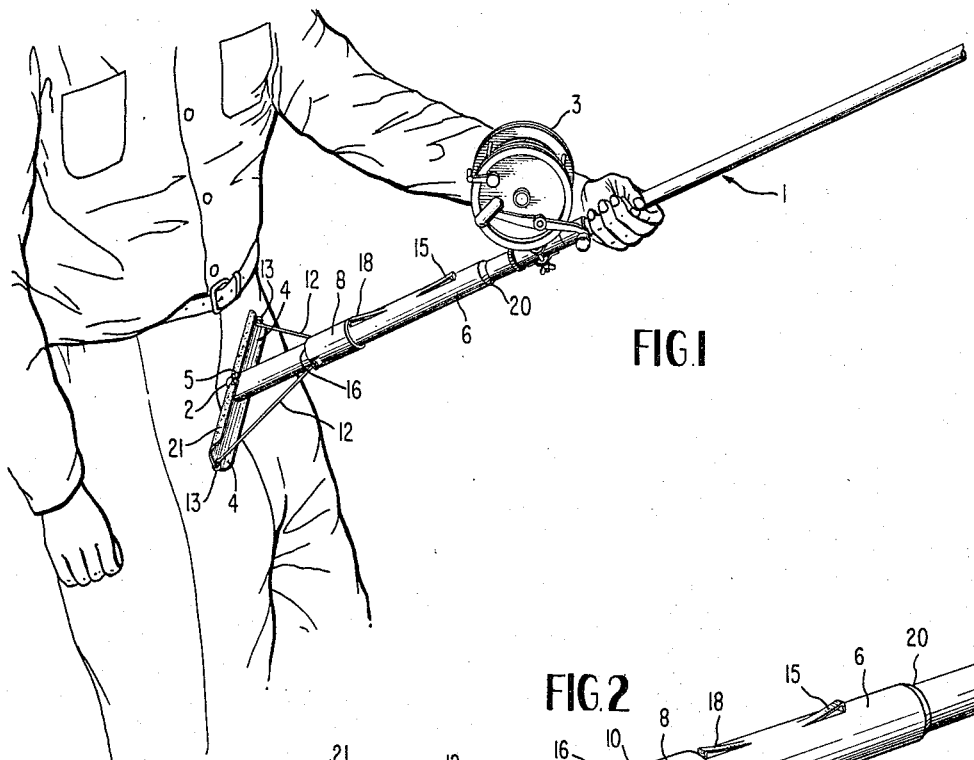
FIG. 1 is a perspective view of the fishing rod support according to the present invention, illustrating the manner in which the device is used by a fisherman.
Figure 2:
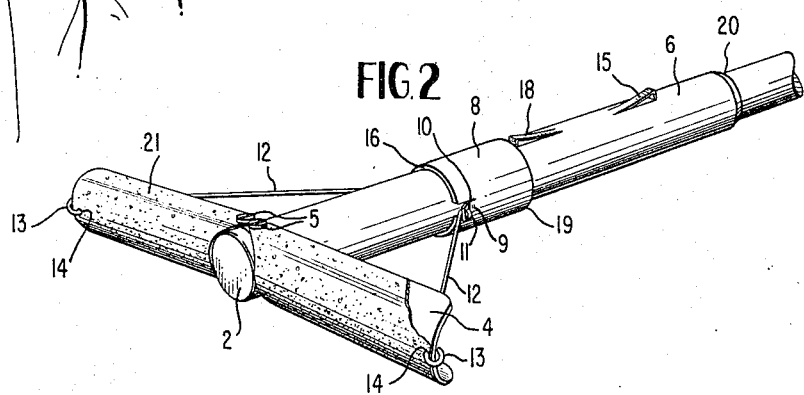
FIG. 2 is an enlarged perspective view of the device shown in FIG. 1.
Figure 3:
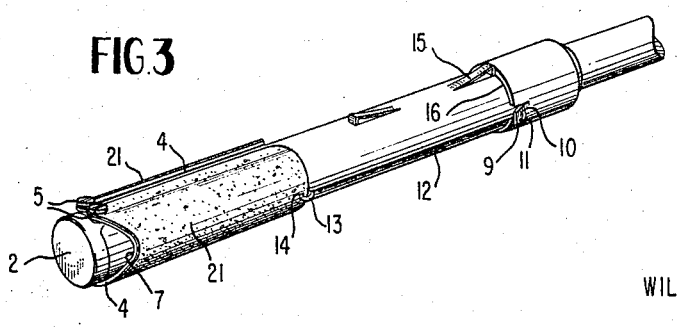
FIG. 3 is a perspective view similar to FIG. 2 showing the support in the collapsed, non-use position.

Referring now to the drawings in detail, a fishing rod, indicated generally by numeral 1, is shown being held in the conventional manner with the butt end 2 of the rod resting comfortably against the abdomen of the fisherman and with the rod held in the left hand, leaving the right hand free to operate the reel 3. A pair of elongated arm members 4 each have one end pivotally mounted, as by screws 5 on rod 1 adjacent the butt end 2. Arms 4 have a substantially semi-circular cross section with the inner radius of the arms being substantially equal to the outer radius of the handle portion 6 of rod 1 so that, when the arms are pivoted about mounting screws 5 to a position substantially parallel to the longitudinal axis of the rod, as illustrated in FIG. 3, the inner surface of the arms closely engage and substantially encircle the handle portion 6. Each of the arms 4 are contoured as at 7 on the end which is mounted to the rod so that, when the arms are extended to the support position illustrated in FIG. 2, contours 7 will engage the outer circumferential surface of handle portion 6 to form a positive stop and limit the pivotal movement of arms 4. Preferably, the outer arcuate surface of arms 4 are coated with a layer of high-friction material 21 to increase the resistance of the support to turning when positioned against the body, and to permit the arms to function as a friction grip handle when folded in the non-use position.

A hollow cylindrical sleeve 8 is mounted for sliding movement axially along handle portion 6 of rod 1 and is provided with a pair of diametrically opposed outwardly extending ears 9 each having openings 10 therein for receiving an eye 11 formed in an elongated linkage rod 12. An eye 13 formed in the other ends of rods 12 are retained in openings 14 in the distal ends of arms 4, so that movement of sleeve 8 axially along handle 6 will cause arms 4 to be pivoted about mounting screws 5 between the position illustrated in FIG. 3 wherein the arms extend substantially parallel to the rod and the position illustrated in FIG. 2 wherein the arms extend substantially perpendicular to the rod.

To releasably retain the support in the collapsed, non-use position illustrated in FIG. 3 of the drawings, a spring detent 15 is formed on the handle portion 6 in position to releasably engage the rear end 16 of sleeve 8 to prevent rearward axially movement of the sleeve and thereby prevent pivotal movement of arms 4. To extend the arms to the support position illustrated in FIG. 2, detent 15 is depressed and sleeve 8 is moved rearwardly thereover, with linkage rods 12 acting to pivot arms 4 about mounting screws 5 until contoured portions 7 are resting firmly against the outer surface of handle portion 6. A second spring detent 18 is formed on handle 6 in position to engage the forward end 19 of sleeve 8 to releasably retain the sleeve in this position with linkage rods 12 being under a compressive load to retain arms 4 in the extended support position.

As an alternative construction, handle portion 6 may be formed as an independent element for attachment to a conventional fishing rod. When formed as an independent attachment, handle portion 6 has an end 20 adapted to receive and support the end of fishing rod 1.

From the above it is apparent that I have provided an improved support for a fishing rod which may be either formed as an integral part of the fishing rod or alternatively as an attachment for a conventional fishing rod and which may be collapsed when desired to eliminate any obstruction to normal use of the fishing rod. In use, the device forms a convenient and effective support for comfortably supporting the butt end of the fishing rod in the desired position against the body of the fisherman. The elongated, T-shaped support, when positioned against the body, effectively resists the tendency of the fishing rod to turn in the hands of the fisherman. By applying a coating of high-friction material to the outer surface of the arms, the effectiveness of the support in resisting turning is greatly increased, and the coated arms form an effective friction grip handle for the rod when the support is folded to the non-use position.

While I have disclosed and illustrated a preferred embodiment of my invention, I wish it understood that I do not intend to be restricted solely thereto, but I do intend to cover all embodiments thereof which would be apparent to one skilled in the art and which come within the spirit and scope of my invention.

I claim:

1. A fishing rod support comprising a pair of elongated arm members each having one end pivotally mounted on the rod adjacent the end thereof for pivotal movement between a non-use position extending substantially parallel to the longitudinal axis of the rod and a support position extending substantially perpendicular to the rod on opposite sides thereof, said arms being arcuate in cross-section and mounted to closely engage and substantially encircle a portion of said rod when in said non-use position and to present a substantially T-shaped support having a smooth curved rear surface substantially flush with the adjacent end of said rod for supporting the butt end of the rod against the body of a fisherman when in said support position, means on said rod for moving said arms between said non-use position and said support position, and means for engaging said moving means to releasably retain said arms in said non-use position and in said support position.

2. The fishing rod as defined in claim 1 wherein said means moving said arms includes a cylindrical sleeve slidably mounted axially along said rod, and a pair of elongated linkage members each having one end connected to said sleeve for movement therewith and their other ends connected to the distal ends of the respective arms so that movement of said sleeve along said rod will effect movement of said arms about said pivotal mountings.

3. A fishing rod support as defined in claim 2 wherein said means which releasably retain said arms in said non-use and in said supporting positions includes spring detent means carried by said rod in position to engage and releasably retain said sleeve against movement axially along said rod.

4. The fishing rod support as defined in claim 1 wherein the outer convex surfaces of said arcuate arm members are coated with a high friction material to increase the resistance to turning when said arms are held against the body of a fisherman and to form a friction grip handle for said rod when in said non-use position.

5. An attachment for a fishing rod comprising an elongated cylindrical extension member, means on one end of said extension for receiving and supporting the butt end of a fishing rod, a pair of elongated arm members each having one end pivotally mounted on said extension member adjacent the other end thereof for pivotal movement between a non-use position extending substantially parallel to the longitudinal axis of said extension and a support position extending substantially perpendicular to said extension on opposite sides thereof, said arms being arcuate in cross-section and mounted to closely engage and substantially encircle a portion of said cylindrical extension when in said non-use position and to present a substantially T-shaped support having a smooth curved rear surface substantially flush with the adjacent other end of said extension member for supporting a fishing rod against the body of a fisherman, means on said extension member for moving said arms between said non-use position and said support position, and means for engaging said moving means to releasably retain said arms in said non-use position and in said support position.

6. The fishing rod as defined in claim 5 wherein said means moving said arms includes a cylindrical sleeve slidably mounted for movement axially along said extension, and a pair of elongated linkage members each having one end connected to said sleeve for movement therewith and their other ends connected to the distal ends of the respective arms so that movement of said sleeve along said extension will effect movement of said arms about said pivotal mountings.

7. A fishing rod support as defined in claim 6 wherein said means for releasably retaining said arms in said non-use and in said support positions includes spring detent means carried by said extension in position to engage and releasably retain said sleeve against movement axially along said extension.

8. The fishing rod support as defined in claim 5 wherein the outer convex surfaces of said arcuate arm members are coated with a high friction material to increase the resistance to turning when said arms are held against the body of a fisherman and to form a friction grip handle for said rod when in said non-use position.

References Cited by the Examiner

UNITED STATES PATENTS

| | | | |
|---|---|---|---|
| 578,809 | 3/1897 | Bronson | 248—171 X |
| 863,820 | 8/1907 | Wingert | 248—171 X |
| 2,665,866 | 1/1954 | Goldinger | 43—21.2 X |
| 2,849,202 | 8/1958 | McCombs | 248—44 |
| 2,995,855 | 8/1961 | Bell | 43—21.2 |
| 3,159,939 | 12/1964 | Transeau | 43—21.2 |
| 3,163,297 | 12/1964 | Raynor | 248—171 X |

SAMUEL KOREN, *Primary Examiner.*

D. J. LEACH, *Assistant Examiner.*